United States Patent
Ernst et al.

(10) Patent No.: US 6,764,108 B2
(45) Date of Patent: Jul. 20, 2004

(54) ASSEMBLY OF HOLLOW TORQUE TRANSMITTING SUCKER RODS

(75) Inventors: Hugo A. Ernst, Buenos Aires (AR); Daniel Johnson, Buenos Aires (AR); José Villasante, Buenos Aires (AR)

(73) Assignee: SIDERCA S.A.I.C., Buenos Aires (AR)

(*) Notice: Subject to any disclaimer, the term of this patent is extended or adjusted under 35 U.S.C. 154(b) by 0 days.

(21) Appl. No.: 10/254,500

(22) Filed: Sep. 26, 2002

(65) Prior Publication Data

US 2003/0085570 A1 May 8, 2003

Related U.S. Application Data

(63) Continuation-in-part of application No. 09/679,359, filed on Oct. 5, 2000, now abandoned.

(30) Foreign Application Priority Data

Dec. 3, 1999 (AR) ............................ P99 01 06162

(51) Int. Cl.[7] .......................... F16L 25/00; F16L 15/00
(52) U.S. Cl. ..................... 285/333; 285/334; 285/355; 285/390
(58) Field of Search ............................... 285/333, 334, 285/355, 390

(56) References Cited

U.S. PATENT DOCUMENTS

| | | | |
|---|---|---|---|
| 262,086 A | 8/1882 | Mithoff ........................ 285/333 |
| 1,851,714 A | * 3/1932 | McCullough ............... 403/296 |
| 2,070,077 A | * 2/1937 | Davis ........................... 285/89 |
| 2,239,942 A | * 4/1941 | Stone et al. ................. 285/110 |
| 2,893,759 A | 7/1959 | Blose |
| 2,940,787 A | * 6/1960 | Goodner ....................... 403/47 |
| 3,427,050 A | 2/1969 | Krieg .......................... 285/333 |
| 3,476,413 A | * 11/1969 | Brown et al. ............. 285/332.3 |
| 4,377,302 A | 3/1983 | Kohyama et al. |
| 4,600,225 A | 7/1986 | Blose .......................... 285/334 |
| 4,750,761 A | 6/1988 | Watts ........................... 285/333 |
| 4,813,717 A | 3/1989 | Watts ........................... 285/333 |
| 4,852,655 A | * 8/1989 | Guy ............................. 166/380 |
| 4,955,644 A | 9/1990 | Pfeiffer et al. .............. 285/333 |
| 5,427,418 A | 6/1995 | Watts ........................... 285/333 |
| 5,551,510 A | 9/1996 | Mills ............................ 166/68 |
| 5,895,079 A | 4/1999 | Carstensen et al. ......... 285/333 |
| 5,906,400 A | 5/1999 | Gandy .......................... 285/333 |
| 5,931,511 A | 8/1999 | DeLange et al. |
| 6,030,004 A | 2/2000 | Schock et al. .............. 285/333 |
| 6,174,000 B1 | * 1/2001 | Nishi et al. .................. 285/333 |
| 6,237,967 B1 | * 5/2001 | Yamamoto et al. ......... 285/333 |
| 6,485,063 B1 | * 11/2002 | Olivier ........................ 285/333 |

FOREIGN PATENT DOCUMENTS

FR    2190237    1/1974

OTHER PUBLICATIONS

Grade D Hollow Sucker Rod, CPMEC Brochure, Undated.

* cited by examiner

*Primary Examiner*—James M. Hewitt
(74) *Attorney, Agent, or Firm*—Fitzpatrick, Cella, Harper & Scinto

(57) ABSTRACT

An elongated drive string assembly includes a plurality of hollow sucker rods and connecting elements with an axis, connected together and between a drive head located at the surface of an oil well and a rotary pump located deep down in an oil well. Each hollow sucker rod has at least a first end including an internal female threaded surface engaging an external male threaded surface on a connecting element, such as a nipple. The first end also includes a torque shoulder, which engages a torque shoulder formed on the connecting element. The threads are frusto-conical, non-symmetrical threads with a differential diametral taper. The torque shoulders have a maximized mean diameter and cross-sectional area to resist storing reactive torque in the drive string. The nipple has a wall cross-section that increases towards the torque shoulders from each free end, to increase fatigue resistance.

20 Claims, 10 Drawing Sheets

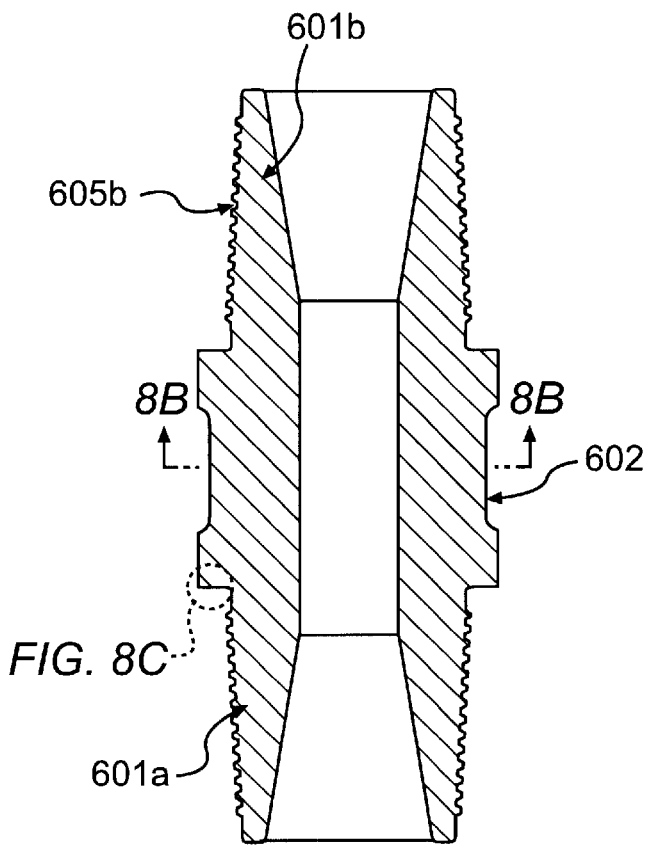
FIG. 8A
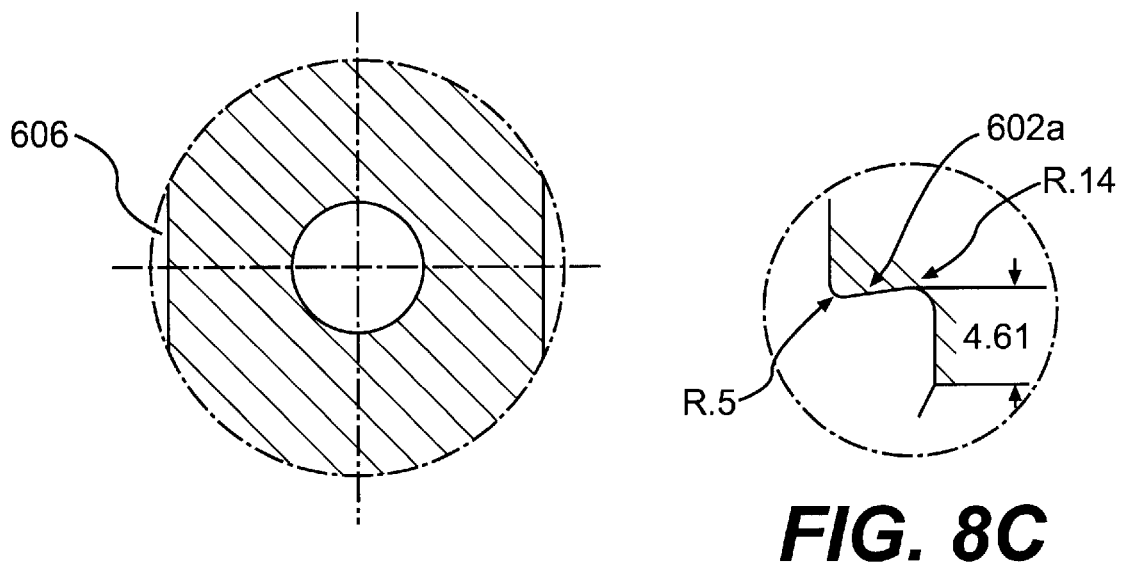
FIG. 8B
FIG. 8C

ASSEMBLY OF HOLLOW TORQUE TRANSMITTING SUCKER RODS

CROSS-REFERENCE TO RELATED APPLICATIONS

This application is a Continuation-In-Part of U.S. Application Ser. No. 09/679,359, filed Oct. 5, 2000 now abandoned, which claims the benefit of Argentina P99 01 06162, filed Dec. 3, 1999.

BACKGROUND OF THE INVENTION

1. Field of the Invention

The present invention relates to an elongated assembly of hollow, torque transmitting pumping rods, used to selectively rotate a rotary pump located deep down hole in an oil well from a drive head located at the surface of the oil well. A pumping rod assembly or sucker rod string is significantly distinguished in the art by the fact that such a string is not typically undergoing substantially free rotation like a drill pipe string, but rather is a true drive shaft that stores large amounts of reactive torque due to its large length, typically between 1,500 to 6,000 feet. The present invention comprises individual elements referred to herein as a "Hollow Sucker Rod" with at least a first end having a female thread and a "Connecting Element" which may be a separate "Nipple Connecting Element" with a pair of male threads or an integral male thread on a second, upset end of a Hollow Sucker Rod.

2. Description of the Related Art

Non-surging oil well extraction is normally achieved by means of pumping systems. The most common system uses an alternating pump located at the bottom of the well driven by a sucker rod string that connects the bottom of the well with the surface, where an alternating pumping machine to drive the string up and down is located. The sucker rods in the prior art, therefore, were designed originally to simply reciprocate up and down, and were are manufactured to API Specification 11B using solid steel bars with an upset end and a threaded end, each thread being of solid cylindrical section. The rods typically were connected one with the other by means of a cylindrical threaded coupling. More efficient pumping is performed when an oil extracting progressive cavity pump (PCP), or like rotary down hole pump is used. Among other advantages, PCP pumping of oil allows for higher oil extraction rates, reduced fatigue loads, reduction in wear on the inside of production tubing, and the ability to pump high viscosity and high solids component oils. PCP pumps are installed at the bottom of the well and driven from the surface by an electric motor connected to a speed-reducing gearbox by means of a string of torque transmitting rods. Traditionally standard API sucker rods are used to drive PCP pumps notwithstanding the fact that these rods have not been designed to transmit torsional loads. The transmission of torque by means of sucker rod strings presents the following disadvantages, i) low torque transmitting capacity, ii) high backspin iii) big stiffness differential between the connection and the rod body, all factors that enhance the possibility of fatigue failures. The reason for rupture on this type of conventional rod is failure due to fatigue in the junction zone of the head of the rod with the body of same due to the difference in structural rigidity between both parts—the body of the rod and the head of the rod.

For a given cross sectional area, torque transmission by a hollow rod with an annular cross section is more efficient than with a narrower, solid circular cross section. With the above mentioned concept in mind the prior art includes a hollow sucker rod that simply uses a standard API external cylindrical thread on a first end connector and an internal API thread on a second end connector, each connector being butt welded to a pipe body, which creates significant and abrupt change in section between the pipe body and each connection body. (See Grade D Hollow Sucker Rod, CPMEC Brochure, undated). The problem of sucker rod string backspin, and details of a drive head at the surface of an oil well and a rotary pump deep down hole in an oil well operation, which is the specific field of invention being addressed herein, can be found in Mills (U.S. Pat. No. 5,551,510), which is incorporated herein by reference.

Various thread and shoulder arrangements are discussed in the prior art with respect to joining together oil well drill pipe, well casing and tubing. See, for example, Pfeiffer et al. (U.S. Pat. No. 4, 955,644); Carstenson (U.S. Pat. No. 5,895,079), Gandy (U.S. Pat. No. 5,906,400), Mithoff (U.S. Pat. No. 262,086), Blose (U.S. Pat. No. 4,600,225), Watts (U.S. Pat. Nos. 5,427,418; 4,813,717; 4,750,761), Schock et al. (U.S. Pat. No. 6,030,004), and Hardy et al. (U.S. Pat. No. 3,054,628). The Watts patents imply that a pre-1986 API standard for strings of casing and tubing was a straight thread, with a turned down collar and that his improvement comprised a flush joint tubular connection with both tapered threads and a shoulder torque. Watts also refer to API standards for tubing and casing where triangular and buttress threads can be used with a torque shoulder. The 1990 patent to Pfeiffer et al, and the 1996 patent to Carstensen et al, in contrast, refer to a more current API standard (truncated triangular thread, connection using a torque shoulder) for strings of casing and tubing that appears to involve frusto-conical threads and shoulders. Carstensen et al at col 7, line 9+ include a discussion about how a particular conical gradient and length of a thread defines stress distribution results. Likewise, Pfeiffer et al at col 2, line 51+ say their threads are tapered and according to "API standards" with their improvement essentially only having to do with transitional dimensions. Hence, the problem addressed by Pfeiffer is an assembly of drill pipe sections where it apparently was critical to use a compatible and standard non-differential thread according to API standards, and also with no incomplete threads and no torque shoulder specification. The main features of the Pfeiffer thread appear to be symmetrical, truncated triangle threads (between 4 and 6 threads per inch, 60° flank angle) and a thread height that is the same for the male and female thread (between 1.42 and 3.75 mm). Also, there is identical nominal taper on male and female ends (between 0.125 and 0.25). Schock et al. illustrate a particular tool joint for drill pipe where the unexpected advantage for drill pipe applications derives from tapered threads that significantly must be very coarse (3½ threads per inch) and have equal angle (75°) thread flanks and elliptical root surfaces.

However, the different problem of backspin inherent in the intermittent operation of a sucker rod string when driving a PCP pump is not apparently addressed in any of these references. The design of the invention was made with certain specific constraints and requirements in mind. First, the minimum diameter of the tubings on the inside of which the Hollow Rods must operate corresponds to API 2⅞" tubing (inner diameter=62 mm) and API 3½" tubing (inner diameter=74.2 mm). The oil extraction flow rate must be up to 500 cubic meters per day, maximum oil flow speed must be 4 meters per second. The above-mentioned values strongly restrict the geometry of the rods under design. Second, to ensure a Hollow Rod with a high yield torque so that maximum torque is transmitted to the PCP pump without damage to the Hollow Rod string. Third, to minimize and distribute stresses in the threaded sections. This requirement is met by using a particular conical thread, differential taper, low thread height and a conical bore in the sections under the threads. Fourth, the Hollow Sucker Rod must have good fatigue resistance. Fifth, to ensure low backspin, and high resistance to axial loads. Sixth, ease of make up and break out (assembly of mating threaded parts) must be ensured, and is by a tapered thread. Seventh, to ensure high resistance to unscrewing of the Hollow Sucker Rod due to backspin, or the counter-rotation of a sucker rod string when driving motor stops running and the pump acts as a motor. Eighth, to ensure high resistance to jump out of the Hollow Sucker Rod string (Hollow Rod parting at the threaded sections) by means of adequate thread profile and reverse angle on the torque shoulder. Ninth, to minimize head loss of the fluids that occasionally can be pumped on the inside of the Hollow Sucker Rod through the added advantage of a conical bore on the nipple. Tenth, to ensure connection sealabilty due to sealing at the torque shoulder, and also due to diametrical interference at the threads. Eleventh, a thread profile designed so as to optimize pipe wall thickness usage. Twelfth, to eliminate use of the welds due to susceptibility of welds to fatigue damage, sulphide stress cracking damage and also the higher costs of manufacturing.

A first object of the present invention is to provide an assembly of sucker pump rods and either separate threaded unions, or an integral union at the second end of each sucker rod, to activate PCP and like rotary type pumps, capable of transmitting greater torque than the solid pump rods described in the API 11B Norm and also possessing good fatigue resistance. Additionally, the present invention seeks to define a threaded union for hollow rods that is significantly different from, and incompatible with, the standard for sucker rod assemblies as defined in the API 11B Norm, yet still can easily be assembled. In fact the modified buttress thread is unique in that it is differential. For example, API Buttress Casing requires non-differential threads, with the taper for both a pipe and a coupling being 0.625 inches/inch of diameter. Likewise, API 8r casing and API 8r tubing both also require non-differential threads, with the taper for both a pipe and a coupling being 0.625 inches/inch of diameter. Still further, each of API Buttress Casing, API 8r casing and API 8r tubing do not employ any manner of torque shoulder.

A related object of the present invention is to provide an assembly of pump rods and unions with lesser tendency to uncoupling of the unions whenever "backspin" occurs, whether by accident or when intentionally provoked by the deactivation of the pump drive. The present invention surprisingly and significantly decreases the stored torsional energy in a sucker rod string. The stored energy in the string is inversely proportional to the diameter of the rod, and is directly proportional to the applied torque and the length of the string.

Another object of the invention is to provide for an assembly of sucker rods which are hollow and configured with a bore to permit passage of tools (sensors for control of the well) and/or allow interior circulation of fluids (injection of solvents and/or rust inhibitors).

SUMMARY OF THE INVENTION

The present invention addresses the foregoing needs in the art by providing a new type of Hollow Sucker Rod consisting essentially of a pipe central section, with or without an upset, with at least one internal or female conical thread at a first end having a thread vanishing on the inside of the rod and a conical external torque shoulder. That first end is configured to engage a corresponding external or male thread that is differential and also to abut against a conical torque shoulder on either another rod with an externally threaded integral Connecting Element as its second end, or one of the shoulders between the external threads of a separate Nipple Connecting Element. If separate Nipple Connecting Elements are used, then the sucker rod second end is always the same as the first end. If separate Nipple Connecting Elements are not used, then the sucker rod second end is configured with an upset end having a male conical thread adapted to engage the first end of another Hollow Sucker Rod.

A Nipple Connecting Element consists essentially of a central cylindrical section with a pair of conical external torque shoulders. The torque shoulders have a maximized mean diameter and cross-sectional area to resist storing reactive torque in the drive string. The nipple preferably also has a wall section that increases towards the torque shoulders from each free end to increase fatigue resistance. In order to further optimize the stress distribution between the elements, a specific type of thread with a differential taper is used. The overall configuration ensures high shear strength, lowered stress concentration and a surprising resistance to storing reactive torque, which minimizes dangerous backspin when power to the sucker rod string is interrupted.

The Nipple Connecting Element member also has trapezoidal, non-symmetric male threads at each end or extreme, separated by a pair of shoulder engaging elements, but that male thread is differential as to the diametral taper of the female thread on at least the first end of a Hollow Sucker Rod. The threaded nipple and the rod can be joined with or without discontinuity of outer diameter. The ratio of the diameter of the union to the diameter of the rod may between 1 without discontinuity of diameters, to a maximum of 1.5. In this manner the mean value of the external diameter throughout the length of the string will always be greater to that of a solid rod with equivalent cross-sectional area mated to a conventional union means. Hence, for a given length of string and cross-sectional area, resistance to "backspin" will be greater in an assembly according to the present invention. The dimensions of the nipple also may be defined with a conical inner bore proximate the length of each threaded extreme, to further enhance an homogenous distribution of tensions throughout the length of each thread and in the central body portion of the Nipple Connecting Element. In this way it is possible to obtain a desired ratio of diameters of the threaded ending of the nipple with respect to the internal diameter, and a ratio of outside diameter of the nipple with respect to the internal diameter and an additional ratio between the external diameter of the nipple and the diameter of each threaded extreme.

In a first object of the present invention, the essential characteristic of a Hollow Sucker Rod is at least a first end of a tubular element threaded with a conical female thread which is configured as a Modified Buttress or SEC thread and vanishes on the inside of the tubular element, in combination with a conical frontal surface at an angle between 75° and 90°, known as a torque shoulder. The external diameter of the HSR 48×6 External Flush and the HSR 42×5 Upset embodiments comprise a tubular rod body element away from the ends being 48.8 mm or 42 mm and the external diameter of the tubular element in the upset end of a 42 mm rod being 50 mm. These dimensions are critical since sucker rods of that maximum diameter can fit within standard 2⅞ inch tubing (62 mm inside diameter). For 3½ inch tubing (74.2 mm inside diameter) the HSR 48×6 Upset, with a diameter at the upset end of 60.6 mm, can be used for maximum advantage. The thread shape is trapezoidal and non-symmetric, with a Diametrical taper in the threaded section. The Length of threads on at least the first end of the tubular element are incomplete due to vanishing of thread on the inside of the tubular element. There is an 83° angle (Beta) of the conical surface in the torque shoulder as shown in FIG. 2A. There are radii at the inner and outer tips of the torque shoulder. At the end of the threaded section a short cylindrical section on the inside of the threaded area transitions the threaded area to the bore of the tubular element.

In a first object of the present invention, the essential characteristic of a Nipple Connecting Element is a differential thread engagement on either side of a central section that is externally cylindrical with a larger cross-sectional area in the vicinity of the torque shoulder for surprisingly improved fatigue resistance. At either side of this central section external torque shoulders are located to mate with a torque shoulder on a first end of a Hollow Sucker Rod. The mean diameter and total cross-sectional area of the torque shoulder is maximized, to allow maximum torque handling.

In addition, either end of the nipple externally threaded is conical so to create a larger cross-sectional area in the vicinity of the torque shoulder and thereby surprisingly improve fatigue resistance. To achieve this advantage a narrowing conical inner bore starts proximate the free end of each threaded extreme and thereby defines an increasing wall thickness cross-section towards the central section of the nipple. The external diameter of the central section of the nipple is 50 mm or 60.6 mm and that central section may have a pair of machined diametrically opposite flat surfaces, to be engaged by a wrench during connection make up. The thread is a Modified Buttress thread, which creates a differential due to slightly different amounts of diametral thread taper on the rod and on the nipple. The thread shape also is trapezoidal and non-symmetric. All threads on the nipple are complete. A pair of conical surface act as torque shoulders with a conical frontal surface at an angle between 75° and 90°. There are radii at tips of the torque shoulder, both at an inner corner and an outer corner. Preferably, conical bores under each threaded section of the nipple are connected by a cylindrical bore to create a larger cross-sectional area in the immediate vicinity of the torque shoulder in order to surprisingly improve fatigue resistance.

The thread taper on the nipple and on the rod is slightly different (Differential Taper) to ensure optimal stress distribution. When the connection is made up the corresponding torque shoulders on the rod and on the nipple bear against each other so that a seal is obtained that precludes the seepage of pressurized fluids from the outside of the connection to the inside of said and vice-versa. This sealing effect is enhanced by the diametrical interference between the two mating threaded sections on the first end of the rod and on the nipple.

A better understanding of these and other objects, features, and advantages of the present invention may be had be reference to the drawings and to the accompanying description, in which there are illustrated and described different embodiments of the invention. All of the embodiments are considered exemplary of parts of a preferred assembly embodiment, since any one of the illustrated male ends will successfully mate with any one of the illustrated female ends.

BRIEF DESCRIPTION OF THE DRAWINGS

FIGS. 8A, 8B and 8C respectively represent an axial section view, a shoulder detail view and a cross-section view along Line 8B—8B of a Nipple Connecting Element having first and second male threaded ends, according to a sixth embodiment of the invention, styled Hollow Rod 48.8×6 External Upset.

DESCRIPTION OF THE PREFERRED EMBODIMENTS

Figure 1A:
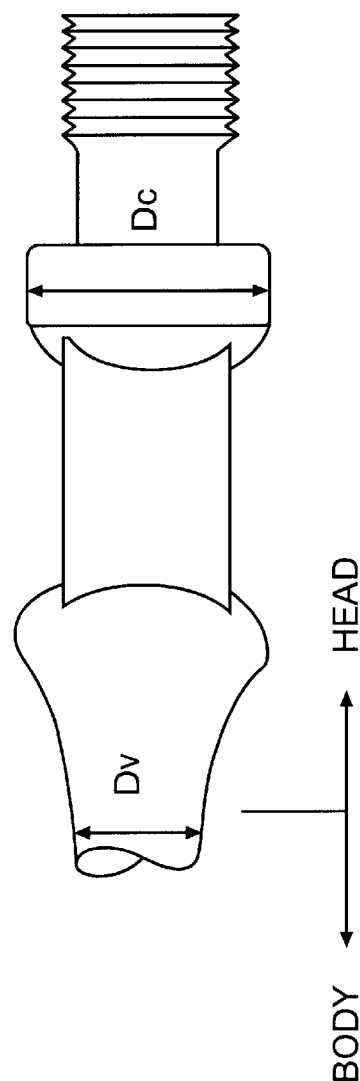
FIGS. 1A and 1B, represent a Prior Art configuration of a conventional solid sucker rod as established in the API 11 B Norm specification.
Figure 1B:
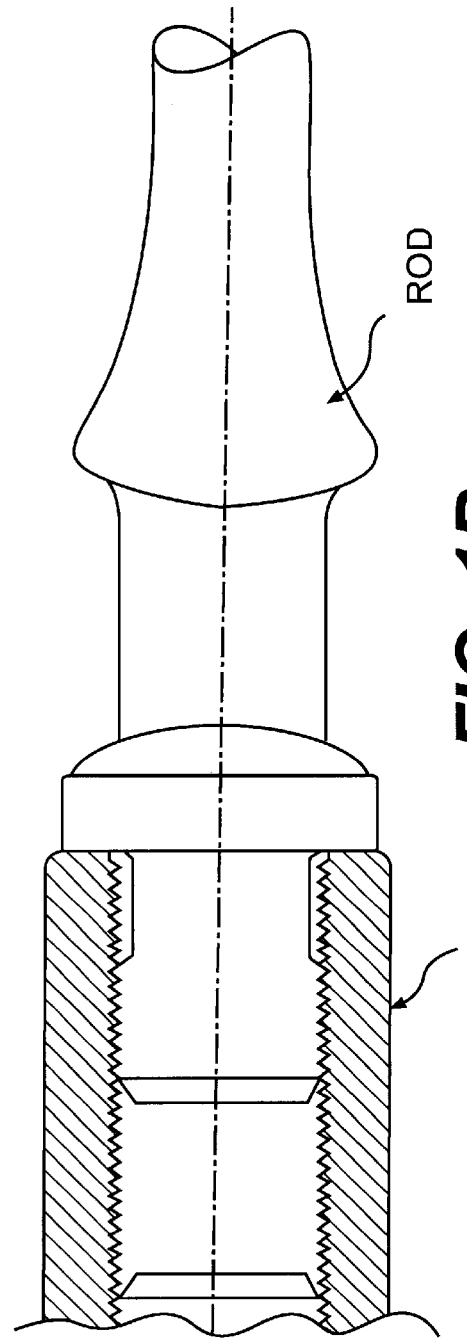

FIG. 1A represents a common solid sucker rod with its conventional threaded first end or head with a cylindrical-type male thread. A large discontinuity between the head of the rod and the body of the rod can easily be seen. Diameters DC and DV, respectively. FIG. 1B is a schematic of the assembly of that solid pump rod with a conventional threaded union or collar according to the API 11 B Norm.

Figure 2A:
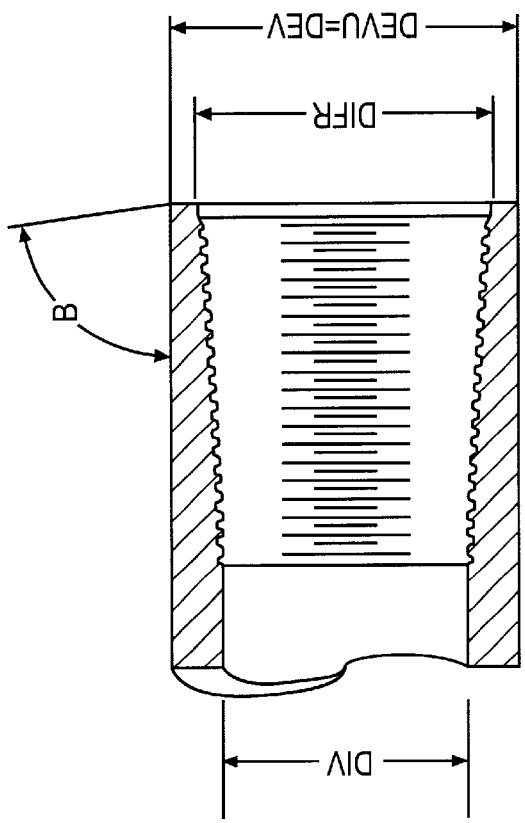
FIGS. 2A, 2B and 2C respectively represent general configurations of a Hollow Sucker Rod first end, a Nipple Connecting Element, and an assembly of both elements according to a first embodiment of the invention, with a constant outer diameter.
Figure 2B:
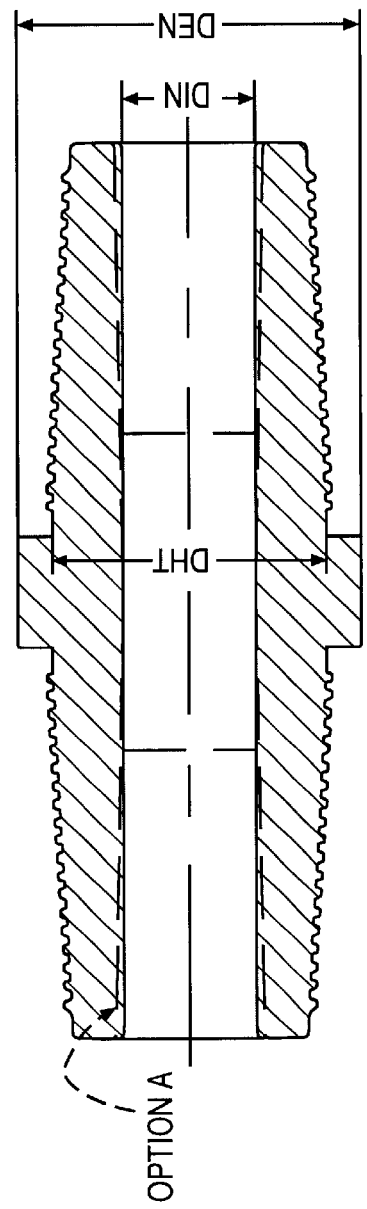
Figure 2C:
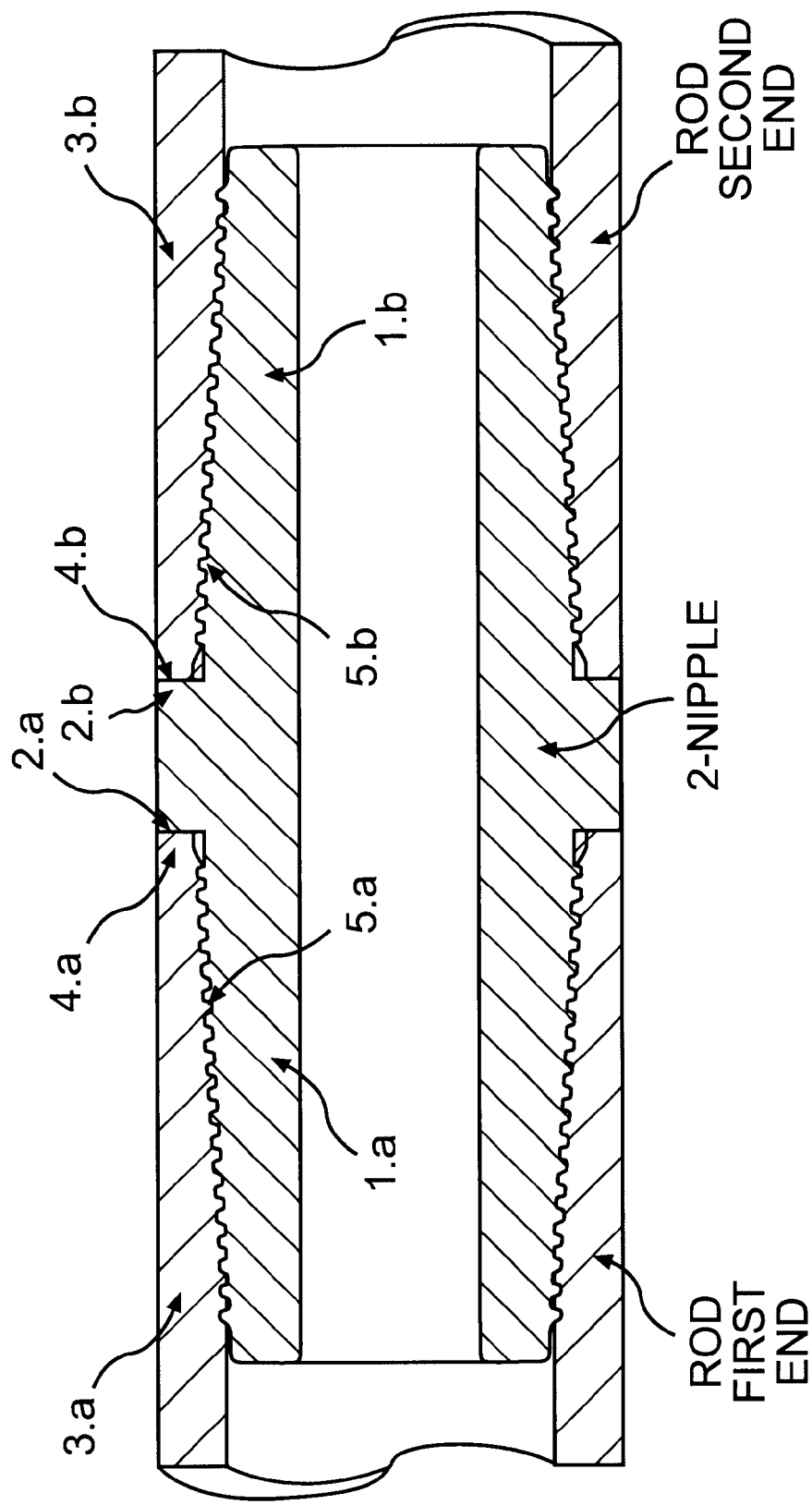

FIGS. 2A–2C respectively represent general configurations of a Hollow Sucker Rod first end, a Nipple Connecting Element, and an assembly of both elements according to a first embodiment of the invention, with a constant outer diameter. FIG. 2A gives references at the female extreme of the hollow rod according to the invention. It is also possible to observe the frustro-conical shape threaded surface in the interior of the rod that diminishes in the internal diameter thereof. FIG. 2B gives references at the nipple or union according to the present invention. The external thread of frustro-conical shape and the presence of two torque shoulders can also be seen. It is also possible to observe the varying of the nipple inner bore diameter with conical shape labeled "Option A", as indicated by a broken line, which in turn creates a larger cross-sectional area in the vicinity of the torque should and surprisingly improves fatigue resistance.

FIG. 2C gives further references for the assembly of two hollow pump rods and one threaded union. It can be observed that the two female threads in the internal diameter of rod (3.a and 3.b) are joined to the corresponding male ends (1a and 1.b) and how torque shoulders (2a and 2.b) are part of nipple (2). The union between the corresponding male and female extremes is accomplished by differential engagement of the frustro-conical shape of the threads (5.a and 5.b). The fact that the thread shape is frustro-conical facilitates the initial setting of each piece and assembly of both parts. Shoulders located at the extreme free end surfaces of the first and second ends of the hollow rods (4.a and 4.b) engage, in the assembled position, against a pair of corresponding torque shoulders formed on the nipple (2.a and 2.b). Said contact planes form a torque shoulder angle (angle "Beta" see FIG. 2A) with respect to the axis of the rod, which angle being between 75° and 90° and most preferably being 83°.

FIG. 2B shows in general geometry references for a connecting element as a separate nipple and specifically defines outside diameter (DEN), internal diameter (DIN) and the start diameter of the torque shoulder (DHT). The connecting element for the invention is characterized by a ratios of diameters according to the following table:

|                   | Range |      |
|-------------------|-------|------|
| Diameter Ratios   | Min.  | Max. |
| DHT/DEN           | 0.60  | 0.98 |
| DIN/DEN           | 0.15  | 0.90 |
| DIN/DHT           | 0.25  | 0.92 |

Figure 3A:
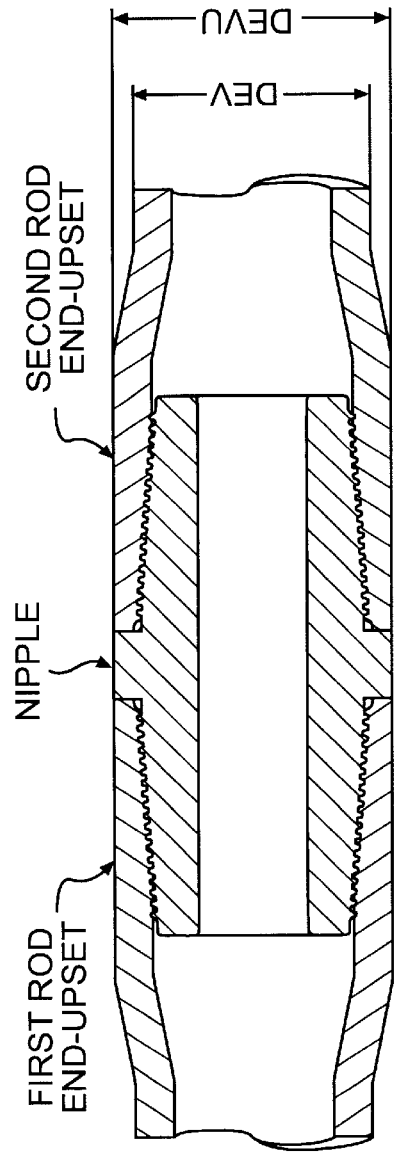
FIG. 3A represents a general configuration of the assembly of a Hollow Sucker Rod having first and second female threaded ends and a Nipple Connecting Element according to a second embodiment of the invention, with an upset end, or an enlarged outer diameter.
Figure 7A:
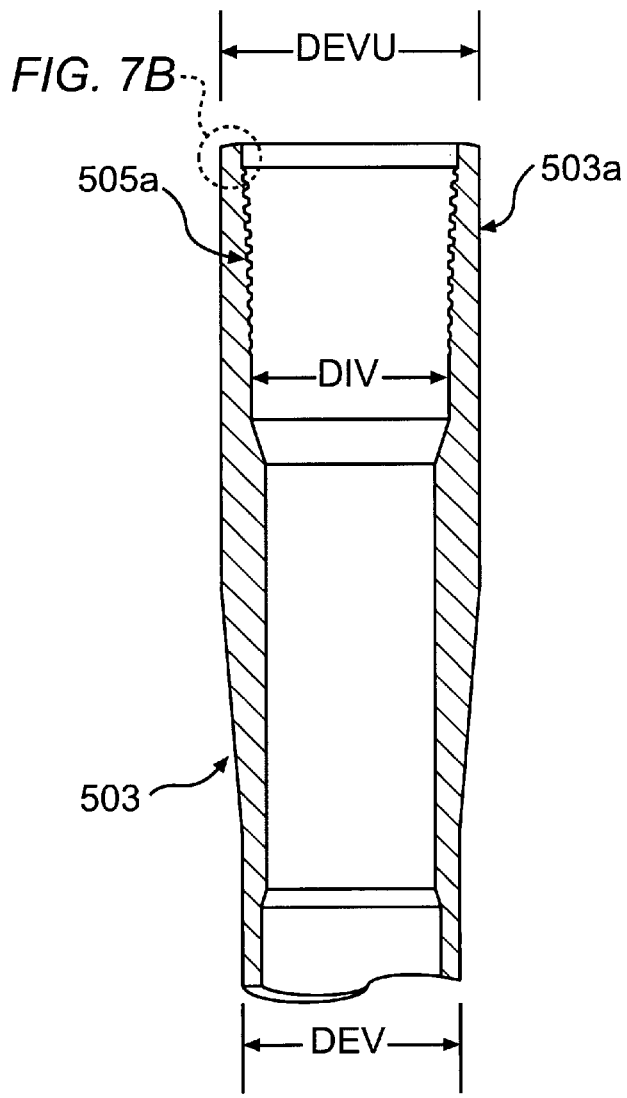
FIGS. 7A and 7B respectively represent an axial section view and a shoulder detail view of a Hollow Sucker Rod having a first female threaded end, according to the fifth embodiment of the invention.
Figures 9A, 9B:
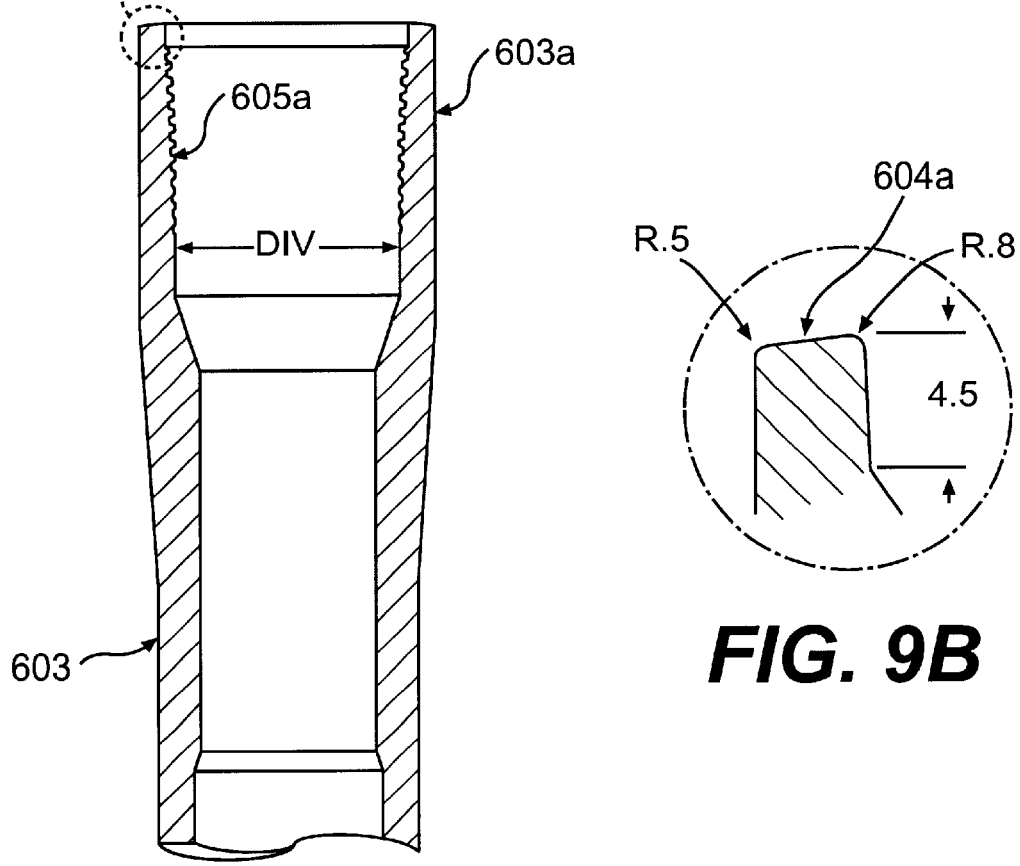
FIGS. 9A and 9B respectively represent an axial section view and a shoulder detail view of a Hollow Sucker Rod having a first female threaded end, according to the sixth embodiment of the invention.

FIG. 2B also illustrates, by the broken line, a conical bore option, Option A, for the nipple inner bore configuration, which is preferred. FIG. 2A shows the hollow rod in the union zone with an outside diameter (DEVU) and an internal diameter of the rod at the extreme surfaces of the first and second ends corresponding to the end of the thread (DIFR). It also shows the outside diameter of the hollow rod (DEV) labeled as DEVU=DEV, because there is no upset end acting as the union. The ratio of the maximum external diameter (DEVU), either of a separate connector element or the upset type end of integral connector element union, to the external diameter of the rod (DEV), as illustrated at FIGS. 3A, 7A and 9A, is maintained within the following range:

$$1 \le \frac{DEVU}{DEV} \le 1.5$$

Hence for a maximum fixed diameter, the mean polar momentum of the hollow rod and connector string is greater than that for a solid pump rod of equal cross section diameter. Transmitted rotation moment or torque is therefore greater in a hollow rod column than in a solid rod column. This is also a determining factor in the resistance to the "backspin" phenomenon or counter-rotation of the rod string. Additionally, the ratio between the starting diameter of the torque shoulder on the connecting element (DHT) and the internal diameter of the hollow rod at the thread free end (DIFR), is maintained, as follows:

$$1 \le \frac{DIFR}{DHT} \le 1.1$$

Figure 3B:
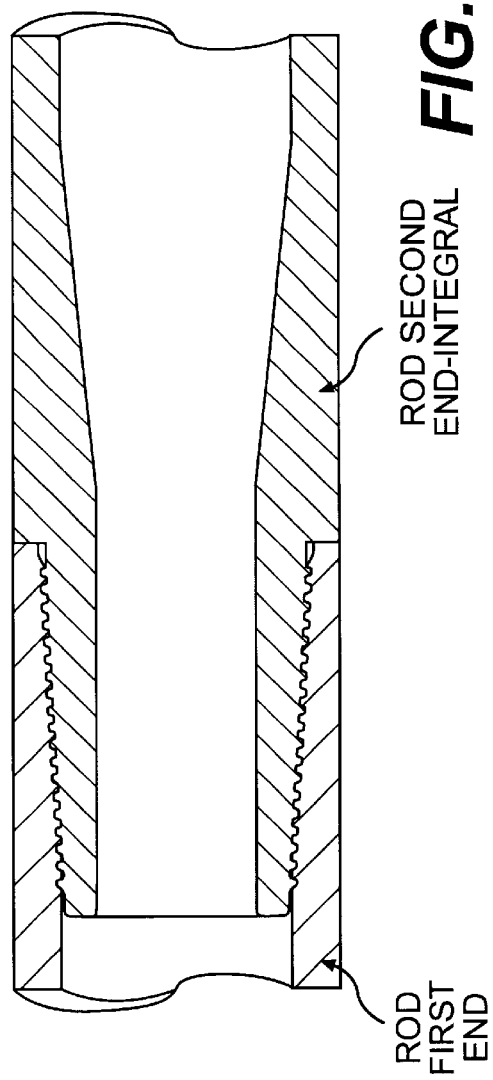
FIG. 3B represents a general configuration of the assembly of a Hollow Sucker Rod having a first female threaded end and a second end with a male threaded end according to a third embodiment of the invention, with a constant outer diameter.

FIG. 3A gives further references at the assembly in which the ratio of the maximum diameter of the union (DEVU) to the diameter of the body of the rod (DEV) is limited (1<DEVU/DEV≦1.5). FIG. 3B is a possible configuration of the invention in which the female thread is machined on an upset first end of the rod, while the opposite or second end is machined with a corresponding male thread, the two threads being complementary but differential in diametral taper to each other. This configuration will be referred to as an upset rod, or as an integral union version.

FIGS. 4–10, inclusive, relate to preferred embodiments where a Hollow Sucker Rod comprises at least a first end of a tubular element threaded with a conical female thread which is configured as a Modified Buttress or SEC thread and which vanishes on the inside of the tubular element, in combination with a torque shoulder angle (Beta) of between 75° and 90°. The external diameter of the tubular element away from the ends being either 42 mm or 48.8 mm and the external diameter of the tubular element in the upset end, if present, being either 50 or 60.6 mm.

Figure 4A:
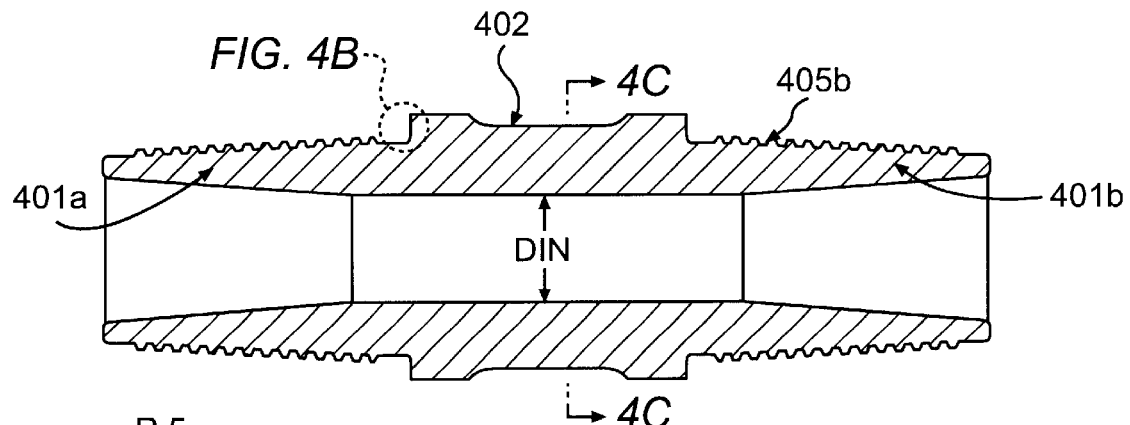
FIGS. 4A, 4B and 4C respectively represent an axial section view, a shoulder detail view and a cross-section view along Line 4C—4C of a Nipple Connecting Element having first and second male threaded ends, according to a fourth embodiment of the invention, styled Hollow Rod 48×6 External Flush.
Figure 4B:
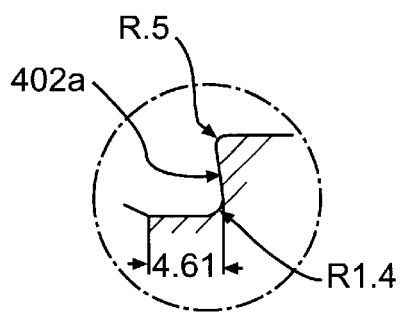
Figure 4C:
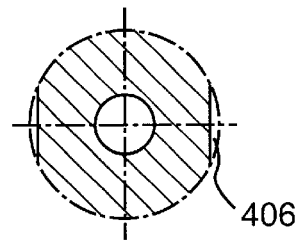

FIGS. 4A, 4B and 4C respectively represent an axial section view, a shoulder detail view and a cross-section view along Line 4C—4C of a Nipple Connecting Element 402 with a flat 406 having first and second male threaded ends, 401 and 401.b, according to a fourth embodiment of the invention, styled Hollow Rod 48×6 External Flush. In FIG. 4A the values are a Modified SEC thread 405.b, 8 threads per inch; DEN=48.8 mm; DIN=20 mm with an expansion to 26 mm over a length of 44 mm to the extreme end; DHT=39 mm; Beta=83°; overall length=158 mm; thread length=46 mm and central section length=50 mm. The shoulder detail 402a in FIG. 4B begins 4.61 mm after the thread, has an inner radius of 1.4 mm and an outer shoulder radius of 0.5 mm.

Figure 5A:
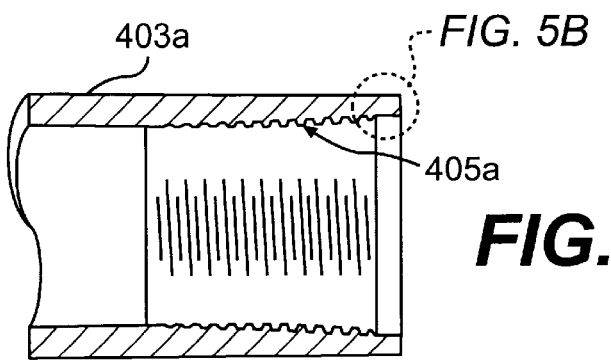
FIGS. 5A and 5B respectively represent an axial section view and a shoulder detail view of a Hollow Sucker Rod having a first female threaded end, according to the fourth embodiment of the invention.
Figure 5B:

FIGS. 5A and 5B respectively represent an axial section view and a shoulder detail view of a Hollow Sucker Rod 403 having a first female threaded end 403a, according to the fourth embodiment of the invention. In FIG. 5A the values are a Modified SEC thread 405a, 8 threads per inch; DEV= 48.8 mm; DIFR=41.4 mm; DIV=37 mm; Beta=83°. The shoulder detail 404a in FIG. 5B has a 30° transition at the thread and extends 4.5 mm; has an inner radius of 0.8 mm and an outer shoulder radius of 0.5 mm.

Figure 6A:
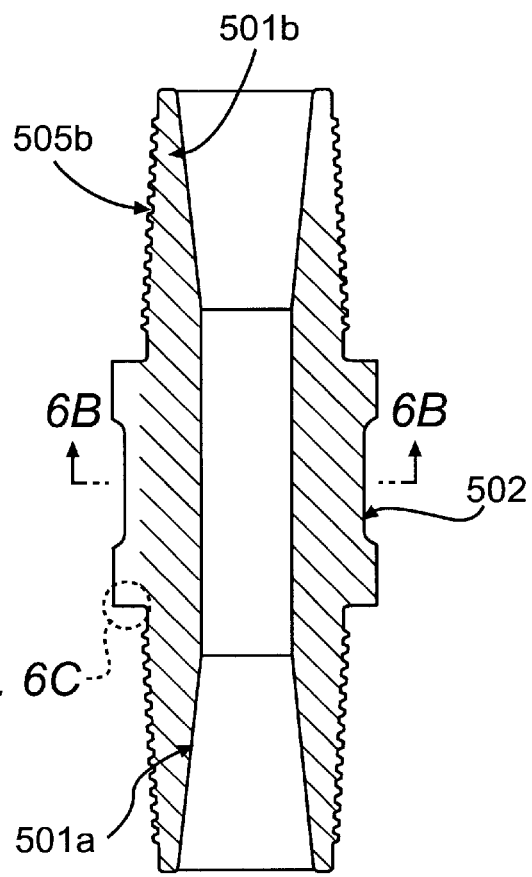
FIGS. 6A, 6B and 6C respectively represent an axial section view, a cross-section view along Line 6B—6B and a shoulder detail view of a Nipple Connecting Element having first and second male threaded ends, according to a fifth embodiment of the invention, styled Hollow Rod 42×5 External Upset.
Figure 6B:
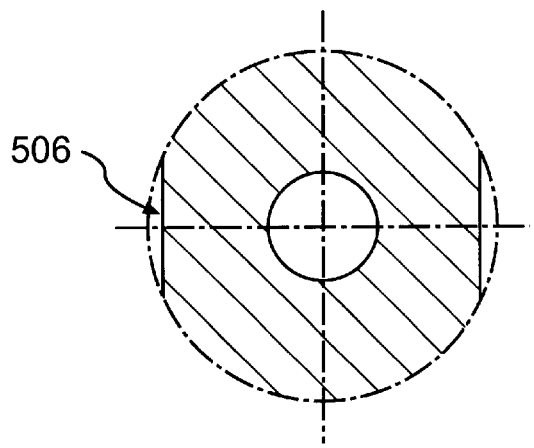
Figure 6C:
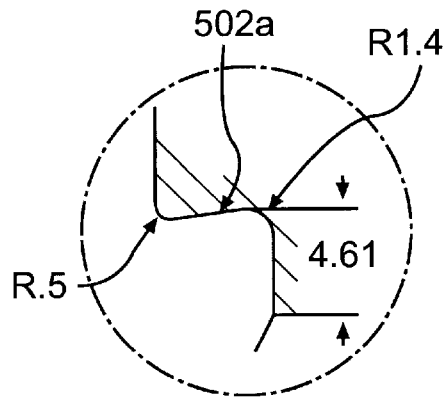

FIGS. 6A, 6B and 6C respectively represent an axial section view, a cross-section view along Line 6B—6B and a shoulder detail view of a Nipple Connecting Element 502 with flat 506 and having first and second male threaded ends, 501a and 501.b, according to a fifth embodiment of the invention, styled Hollow Rod 42×5 External Upset. In FIG. 6A the values are a Modified SEC thread 505.b, 8 threads per inch; DEN=50 mm; DIN=17 mm with an expansion to 25.3 mm over a length of 44 mm to the extreme end; DHT=38.6 mm; Beta=83°; overall length=158 mm; thread length=46 mm and central section length=50 mm. The shoulder detail 502a in FIG. 6C begins 4.61 mm after the thread, has an inner radius of 1.4 mm and an outer shoulder radius of 0.5 mm.

Figure 7B:
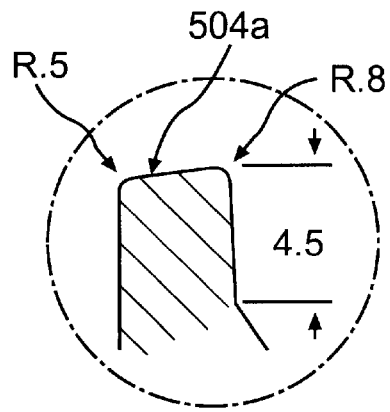

FIGS. 7A and 7B respectively represent an axial section view and a shoulder detail view of a Hollow Sucker Rod 503 having a first female threaded end 503a, according to the fifth embodiment of the invention. In FIG. 7A the values are a Modified SEC thread 505a, 8 threads per inch; DEVU ranging from 50 mm to DEV=42 mm; DIFR=41 mm; DIV=36.4 mm with a transition at 15° to 30 mm starting at 55 mm from the free end and back to 32 mm over a maximum length of 150 mm; Beta=83°. The shoulder detail 504a in FIG. 7B has a 30° transition at the thread and extends 4.5 mm; has an inner radius of 0.8 mm and an outer shoulder radius of 0.5 mm.

FIGS. 8A, 8B and 8C respectively represent an axial section view, a shoulder detail view and a cross-section view along Line 8B—8B of a Nipple Connecting Element 602 with flat 606 and having first and second male threaded ends, 601a and 601.b, according to a sixth embodiment of the invention, styled Hollow Rod 48.8×6 External Upset. In FIG. 8A the values are a Modified SEC thread 605.b, 8 threads per inch; DEN=60.6 mm; DIN=20 mm with an expansion to 33.6 mm over a length of 44 mm to the extreme end; DHT=47 mm; Beta=83°; overall length=158 mm; thread length=46 mm and central section length=50 mm. The shoulder detail 602a in FIG. 8C begins 4.61 mm after the thread, has an inner radius of 1.4 mm and an outer shoulder radius of 0.5 mm.

FIGS. 9A and 9B respectively represent an axial section view and a shoulder detail view of a Hollow Sucker Rod 603 having a first female threaded end 603a, according to the sixth embodiment of the invention. In FIG. 9A the values are a Modified SEC thread 605a, 8 threads per inch; DEVU ranging from 60.6 mm to DEV=48.8 mm; DIFR=49.4 mm; DIV=44.6 mm with a transition at 15° to 30 mm starting at 55 mm from the free end and back to 35.4 mm over a maximum length of 150 mm; Beta=83°. The shoulder detail 604a in FIG. 9B has a 30° transition at the thread and extends 4.5 mm; has an inner radius of 0.8 mm and an outer shoulder radius of 0.5 mm.

Figure 10A:
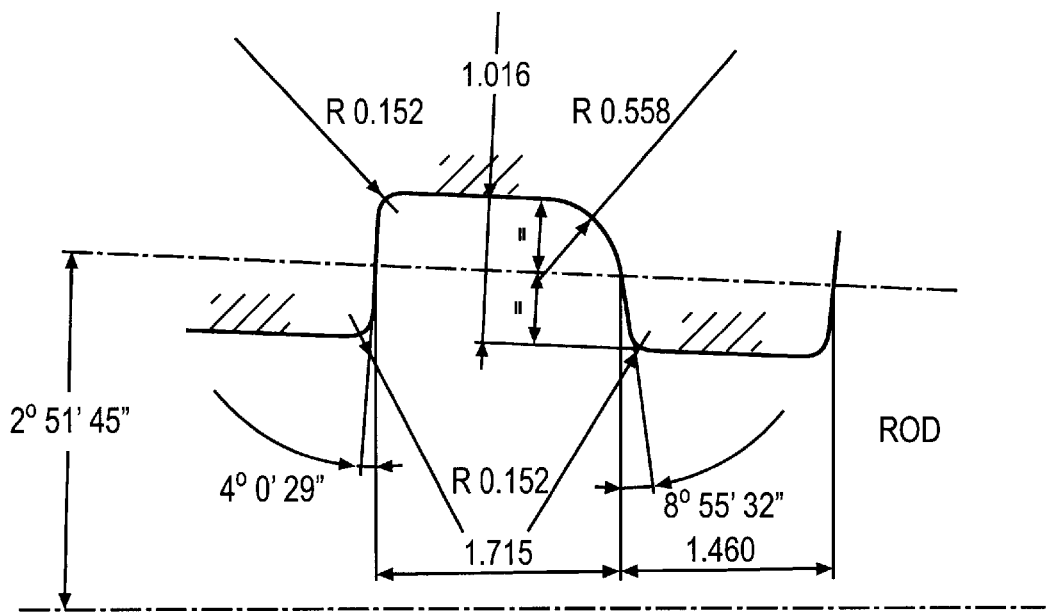
FIG. 10A represents an axial section view and dimension detail view of a first female threaded end on a Hollow Sucker Rod showing the configuration of a trapezoidal, non-symmetric thread profile that is a Modified Buttress or SEC thread, according to the preferred embodiments of the invention.

FIG. 10A represents an axial section view and dimension detail view of a first female threaded end on a Hollow Sucker Rod showing the configuration of a trapezoidal, non-symmetric thread profile that is a Modified Buttress or SEC thread, according to the rod first end preferred embodiment. The female thread shape of each Hollow Sucker Rod is trapezoidal and non-symmetric and is incomplete. The thread pitch is 8 threads per inch. The thread height is 1.016+0/−0.051 mm. The Diametrical taper in the threaded section is 0.1 mm/mm. The Length of threads on at least the first end of the tubular element is 44 mm., with part of the threads being incomplete due to vanishing of thread on the inside of the tubular element. The thread taper angle is 2° 51' 45"; the tooth inner surface is 1.46 mm and the teeth spacing is 1.715 mm; the leading edge has a 4° taper or load flank angle and an inner radius of 0.152 mm while the trailing edge has a 8° taper and a larger inner radius of 0.558 mm. At the end of the threaded section a short cylindrical section on the inside of the threaded area transitions the threaded area to the bore of the hollow tubular element.

Figure 10B:
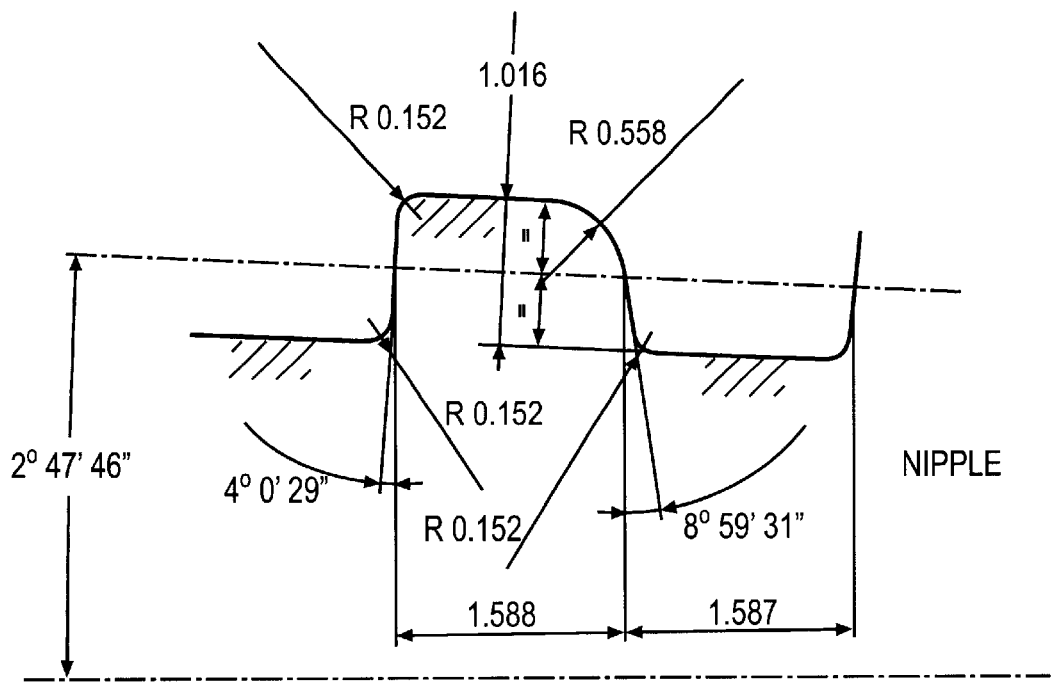
FIG. 10B represents an axial section view and dimension detail view of a first male threaded end on a Nipple Connecting Element showing the configuration of a trapezoidal, non-symmetric thread profile that is a Modified Buttress or SEC thread, according to the preferred embodiments of the invention.

FIG. 10B represents an axial section view and dimension detail view of a first male threaded end on a Nipple Connecting Element showing the configuration of a trapezoidal, non-symmetric thread profile that is a Modified Buttress or SEC thread, according to the nipple first or second end preferred embodiment. The external diameter of the central section of each Nipple Connecting Element is 50 mm or 60.6 mm and the central section can present a pair of machined diametrically opposite flat surfaces, to be engaged by a wrench during connection make up. The male thread is a Modified Buttress thread and is complete across both ends of the nipple. The threaded section pitch is 8 threads per inch. The thread height lies between 1.016+0.051/−0 mm. The diametrical thread taper in the threaded area is 0.0976 mm/mm. The thread shape is trapezoidal and non-symmetric. The length of threads on each extreme of the nipple is 46 mm. All threads on the nipple are complete. The angle of the conical surface in the torque shoulder (Beta) is 83°. The radius at the tips of the torque shoulder is 1.4 mm for the internal radius and 0.5 mm for the external radius. There are preferred conical bores under each threaded section of the nipple, which are connected by a cylindrical bore. The thread taper angle is 2° 47' 46"; the tooth inner surface is 1.587 mm and the teeth spacing is 1.588 mm; the trailing edge has a 4° taper or load flank angle and an outer radius of 0.152 mm while the leading edge has a 8° taper and a larger outer radius of 0.558 mm.

Hence, for all preferred embodiments, there is a diametral or differential taper. For example the rod first end taper is 0.1 inches/inch, while the corresponding taper of the either nipple end is 0.0976 inches/inch. For all preferred embodiments, the angle of the conical surface in the torque shoulder (Beta) is preferably 83°. The radiuses at the tips of the torque shoulder are 0.8 mm for the internal radius and 0.5 mm for the external radius.

Likewise, for all preferred embodiments, the Connecting Element has a central section that is externally cylindrical. Close to the outer diameter of this central section external torque shoulders are located to mate with the torque shoulder on a first end of a Hollow Sucker Rod. Both extremes of a nipple are conical and externally threaded, and a conical inner bore proximate the length of each threaded extreme creates an advantageous combination of structure, to ensure an increasing cross-section of the nipple from each free end of the nipple towards the central section, and the torque shoulder locations.

While preferred embodiments of our invention have been shown and described, the invention is to be solely limited by the scope of the appended claims.

We claim:

1. An elongated drive string assembly comprising a plurality of hollow sucker rods and connecting elements with an axis, connected together and between a drive head located at the surface of an oil well and a rotary pump located deep down the oil well, wherein each hollow sucker rod has at least a first end comprising an internal female threaded surface engaging an external male threaded surface on a connecting element, wherein said threads are frusto-conical and non-symmetrical, but differential in diametral taper to each other; the first end of each hollow sucker rod further comprising an annular torque shoulder engaging an annular torque shoulder on the connecting element, and being characterized in that, for an outside diameter of the connecting element (DEN), an internal diameter (DIN) of the connecting element, and a starting diameter of the torque shoulder on the connecting element (DHT), the following ratios are maintained:

| Diameter Ratios | Range | |
|---|---|---|
| | Min. | Max. |
| DHT/DEN | 0.60 | 0.98 |
| DIN/DEN | 0.15 | 0.90 |
| DIN/DHT | 0.25 | 0.92. |

2. An elongated drive string assembly according to claim 1, wherein the differential threads are each non-symmetrical truncated trapezoids in thread shape; the thread is complete on the connecting element and incomplete on the first end of the hollow rod; the torque shoulder on the connecting element makes an angle with the axis of the rod which is between 75° and 90°, and being characterized in that the ratio of the outside diameter of the connecting element (DEVU) to the outside diameter of the hollow rod (DEV) is maintained within the following range:

$$1 \le \frac{DEVU}{DEV} \le 1.5.$$

3. An elongated drive string assembly according to claim 2, wherein the ratio between the internal diameter of the hollow rod at the first end (DIFR) and the starting diameter of the torque shoulder on the connecting element (DHT) is maintained within the following range:

$$1 \le \frac{DIFR}{DHT} \le 1.1.$$

4. An elongated drive string assembly according to claim 1, wherein each connecting element is a separate nipple connector element having male threads on each end separated by a central section defining a pair of torque shoulders wherein the differential threads are each non-symmetrical truncated trapezoids in thread shape; the thread is complete on the nipple and incomplete on the first end of each hollow rod; each torque shoulder in said pair makes an angle with the axis of the rod which is between 75° and 90°, and being characterized in that the ratio of the outside diameter of the connecting element (DEVU) to the outside diameter of the hollow rod (DEV) is maintained within the following range:

$$1 \le \frac{DEVU}{DEV} \le 1.5.$$

5. An elongated drive string assembly according to claim 4, wherein the ratio between the internal diameter of the hollow rod at the first end (DIFR) and the starting diameter of the torque shoulder on the nipple connector element (DHT) is maintained within the following range:

$$1 \le \frac{DIFR}{DHT} \le 1.1.$$

6. An elongated drive string assembly according to claim 1, wherein each connecting element is an integral male thread on the second end of each hollow rod wherein the differential threads are each non-symmetrical truncated trapezoids in thread shape; the thread is complete on the second end and incomplete on the first end of each hollow rod; each torque shoulder on a second end makes an angle with the axis of the rod which is between 75° and 90°, and being characterized in that the ratio of the outside diameter of the connecting element (DEVU) to the outside diameter of the hollow rod (DEV) is maintained within the following range:

$$1 \le \frac{DEVU}{DEV} \le 1.5.$$

7. An elongated drive string assembly according to claim 6, wherein the ratio between the internal diameter of the hollow rod at the first end (DIFR) and the starting diameter of the torque shoulder on the hollow rod second end (DHT) is maintained within the following range:

$$1 \le \frac{DIFR}{DHT} \le 1.1.$$

8. An elongated drive string assembly according to claim 1, wherein the differential threads are each non-symmetrical truncated trapezoids in thread shape; each torque shoulder makes an angle with the axis of the rod which is substantially 83°; the connector element is a separate nipple connector element having substantially conical threads with male threads on each end separated by a central section defining a pair of torque shoulders, and an internal cylindrical bore within the central section communicates with a conical inner bore that is proximate to each threaded end so as to define an increasing cross-section of the nipple from each end of the nipple towards the central section and the torque shoulder locations.

9. An elongated drive string assembly according to claim 8, wherein the differential threads are modified buttress threads, have a pitch of substantially eight threads per inch, and the nipple connector element male threads have a diametral taper in inches per inch of diameter of substantially 0.0976, and the hollow rod female threads have a diametral taper in inches per inch of diameter of substantially 0.1.

10. A hollow sucker rod adapted to engage a connecting element along an axis, wherein the hollow sucker rod has at least a first end comprising an internal female threaded surface adapted to engage an external male threaded surface of a connecting element, which is complementary but differential in diametral taper to the female threaded surface; said first end of the hollow sucker rod further comprising an annular torque shoulder adapted to engage an annular torque shoulder of a connecting element, and being characterized in that, for an outside diameter of a connecting element (DEN), an internal diameter (DIN) of a connecting element, and a starting diameter of the torque shoulder of a connecting element (DHT), the following ratios are maintained:

| Diameter Ratios | Range | |
|---|---|---|
| | Min. | Max. |
| DHT/DEN | 0.60 | 0.98 |
| DIN/DEN | 0.15 | 0.90 |
| DIN/DHT | 0.25 | 0.92. |

11. A hollow sucker rod according to claim 10, wherein the differential thread is a non-symmetrical truncated trapezoid in thread shape; the thread is incomplete on the first end of the hollow rod; the torque shoulder at the first end makes an angle with the axis which is between 75° and 90°, and being characterized in that the ratio of the outside diameter of a connecting element (DEVU) to the outside diameter of the hollow rod (DEV) is maintained within the following range:

$$1 \leq \frac{DEVU}{DEV} \leq 1.5.$$

12. A hollow sucker rod according to claim 11, wherein the ratio between the internal diameter of the hollow rod at the first end (DIFR) and the starting diameter of the torque shoulder on the connecting element (DHT) is maintained within the following range:

$$1 \leq \frac{DIFR}{DHT} \leq 1.1.$$

13. A hollow sucker rod according to claim 12, wherein the differential thread is a modified buttress thread, has a pitch of substantially eight threads per inch, and the hollow rod female thread has a diametral taper in inches per inch of diameter of substantially 0.1 that is adapted to engage a connecting element with a diametral taper in inches per inch of diameter of substantially 0.0976.

14. A connecting element adapted to engage a hollow sucker rod along an axis, wherein an external male threaded surface on the connecting element is adapted to engage a hollow sucker rod first end comprising an internal female threaded surface which is complementary but differential in diametral taper to the male threaded surface; the connecting element further comprising an annular torque shoulder adapted to engage an annular torque shoulder on the first end of a hollow sucker rod, and being characterized in that, for an outside diameter of the connecting element (DEN), an internal diameter (DIN) of the connecting element, and a starting diameter of the torque shoulder of the connecting element (DHT), the following ratios are maintained:

| Diameter Ratios | Range Min. | Max. |
|---|---|---|
| DHT/DEN | 0.60 | 0.98 |
| DIN/DEN | 0.15 | 0.90 |
| DIN/DHT | 0.25 | 0.92. |

15. A connecting element according to claim 14, wherein the connecting element is a separate nipple connector element having male threads on each end separated by a central section defining a pair of torque shoulders; the differential threads are each non-symmetrical truncated trapezoids in thread shape; the thread is complete on the nipple; each torque shoulder in said pair makes an angle with the axis which is between 75° and 90°, and being characterized in that the ratio of the outside diameter of the connecting element (DEVU) to the outside diameter of a hollow rod (DEV) is maintained within the following range:

$$1 \leq \frac{DEVU}{DEV} \leq 1.5.$$

16. A connecting element according to claim 15, wherein the ratio between the internal diameter of a hollow rod at the first end (DIFR) and the starting diameter of the torque shoulder on the connecting element (DHT) is maintained within the following range:

$$1 \leq \frac{DIFR}{DHT} \leq 1.1.$$

17. A connecting element according to claim 14, wherein the connecting element is an integral male thread on the second end of a hollow sucker rod, wherein the differential threads are each non-symmetrical truncated trapezoids in thread shape; the thread is complete on the second end and incomplete on the first end of a hollow sucker rod; the torque shoulder of the connecting element makes an angle with the axis of a rod which is between 75° and 90°, and is characterized in that the ratio of the outside diameter of the connecting element (DEVU) to the outside diameter of a hollow rod (DEV) is maintained within the following range:

$$1 \leq \frac{DEVU}{DEV} \leq 1.5.$$

18. A connecting element according to claim 17, wherein the ratio between the internal diameter of a hollow rod at the first end (DIFR) and the starting diameter of the torque shoulder on the connecting element (DHT) is maintained within the following range:

$$1 \leq \frac{DIFR}{DHT} \leq 1.1.$$

19. A connecting element according to claim 14, wherein the differential thread is a non-symmetrical truncated trapezoid in thread shape; the torque shoulder of the connecting element makes an angle with the axis of substantially 83°; and the connecting element is a separate nipple connector element having substantially conical threads with male threads on each end separated by a central section defining a pair of torque shoulders, an internal cylindrical bore within the central section communicates with a conical inner bore proximate each threaded end, so as to define an increasing cross-section of the nipple from each end of the nipple towards the central section and the torque shoulder locations.

20. A connecting element according to claim 19, wherein the differential thread is a modified buttress thread, has a pitch of substantially eight threads per inch, and each of the nipple connector element male threads has a diametral taper in inches per inch of diameter of substantially 0.0976 and is adapted to engage the female threaded surface of a hollow sucker rod, which has a diametral taper in inches per inch of diameter of substantially 0.1.

* * * * *